US012398865B1

(12) United States Patent
Huang

(10) Patent No.: US 12,398,865 B1
(45) Date of Patent: Aug. 26, 2025

(54) DOWNLIGHT RETROFIT BRACKET

(71) Applicant: Miaobo Huang, Guangdong (CN)

(72) Inventor: Miaobo Huang, Guangdong (CN)

( * ) Notice: Subject to any disclaimer, the term of this patent is extended or adjusted under 35 U.S.C. 154(b) by 0 days.

(21) Appl. No.: 19/076,389

(22) Filed: Mar. 11, 2025

(51) Int. Cl.
*F21V 21/04* (2006.01)
*F21S 8/06* (2006.01)
*F21V 23/00* (2015.01)

(52) U.S. Cl.
CPC .............. *F21V 21/047* (2013.01); *F21S 8/06* (2013.01); *F21V 21/04* (2013.01); *F21V 23/001* (2013.01)

(58) Field of Classification Search
CPC ...... F21V 21/04; F21V 21/047; F21V 23/001; F21S 8/06
USPC ......................................... 362/147, 365, 366
See application file for complete search history.

(56) References Cited

U.S. PATENT DOCUMENTS 3,518,420 A * 6/1970 Kripp ........................ F21S 8/02 362/365
11,739,921 B2 * 8/2023 Elmvang .................. F21S 8/02 362/388
2018/0224095 A1 * 8/2018 Cohen ..................... F21V 21/04

* cited by examiner

*Primary Examiner* — Laura K Tso

(57) ABSTRACT

The downlight retrofit bracket includes an adaptation base, a fixed bracket, a mounting plate, a height adjustment structure, and a decorative component. The adaptation base is configured to adapt to a lamp holder on a downlight, and a power cable electrically connected to the lamp holder on the downlight is arranged on the adaptation base, and without rewiring, so that a workload of retrofitting a light is reduced. The fixed bracket is arranged inside the downlight and is mechanically fixed to a ceiling. The mounting plate is configured to mechanically fix a suspended electrical appliance. The mounting plate is fixed to the fixed bracket through the height adjustment structure. The height adjustment structure is configured to be used to adjust an up-down relative position between the fixed bracket and the mounting plate. This improves the adaptability of the downlight retrofit bracket.

20 Claims, 7 Drawing Sheets

DOWNLIGHT RETROFIT BRACKET

TECHNICAL FIELD

The present invention relates to the technical field of lamp brackets, and in particular, to a downlight retrofit bracket.

BACKGROUND

Since many residential buildings are constructed early, embedded spotlights (downlights) are commonly used for indoor lighting. The embedded spotlight includes a lamp tube fixed on a ceiling and a lamp holder arranged on the lamp tube. The lamp holder is used by a user to mount a bulb to achieve a lighting effect. However, the embedded spotlight has a limited illumination range, and the illumination brightness of the traditional bulb is limited. As a result, a lighting effect is poor, and a modern indoor lighting requirement cannot be met. Furthermore, with an outdated appearance, the embedded spotlight can be hardly integrated into a modern interior decoration style. In addition, when people replace or upgrade the embedded spotlight to a pendant light, people need to modify a ceiling and rearrange wires, so that a user needs to carry out large-scale indoor decoration, which is time-consuming, labor-intensive, and expensive.

SUMMARY

The present invention mainly aims to provide a downlight retrofit bracket, to solve the problem that replacing an embedded spotlight with a pendant light by a user is time-consuming, labor-intensive, and expensive.

In order to solve the technical problem, the technical scheme provided by the present invention is as follows.

A downlight retrofit bracket, including includes:

- an adaptation base for use with a lamp holder on a downlight, the adaptation base is provided with a power cable electrically connected to the lamp holder on the downlight;
- a fixed bracket arranged inside the downlight, the fixed bracket is mechanically fixed to a ceiling;
- a mounting plate for mechanically fixing a suspended electrical appliance, the mounting plate and the fixed bracket are provided with a first opening for threading out the power cable;
- a height adjustment structure, the mounting plate is fixed on the fixed bracket through the height adjustment structure, and the height adjustment structure is configured to be used to adjust an up-down relative position between the fixed bracket and the mounting plate; and
- a decorative component attached to a surface of the ceiling and configured for decoration.

Furthermore, the fixed bracket includes: a fixed plate spaced apart from the mounting plate in an up-down manner, and a plurality of connecting pieces arranged on the fixed plate; the fixed plate is provided with the first opening; the plurality of connecting pieces are distributed around a center on the fixed plate; and the connecting pieces are fixed to the ceiling through first fasteners.

Furthermore, each connecting piece includes a first connecting plate and a second connecting plate formed by bending the first connecting plate downward; the second connecting plate is fixed to the ceiling through the first fastener;

the fixed bracket further includes a second fastener; the first connecting plate is connected to the fixed plate through the second fastener; and the second fastener is at different positions on the first connecting plate or the fixed plate to adjust a relative position between the first connecting plate and the fixed plate.

Furthermore, a surface of the first connecting plate presses against a surface of the fixed plate, and the second connecting plate is perpendicular to the first connecting plate.

Furthermore, the first connecting plate is provided with an elongated strip-shaped hole; the second fastener includes a first screw and a first nut; the first screw is fixed on the fixed plate; the first screw passes through the strip-shaped hole and is locked by the first nut to fix the first connecting plate with the fixed plate; and a distance between two adjacent second connecting plates is defined by a relative position between the first screw and the strip-shaped hole.

Furthermore, the first screw is integrally formed with the fixed plate.

Furthermore, three connecting pieces are included, which are uniformly distributed around the center of the fixed plate.

Furthermore, the second connecting plate is provided with a first through hole, and the first fastener passes through the first through hole to fix the second connecting plate to the ceiling.

Furthermore, the second through hole includes a first hole body and a second hole body communicated to the first hole body; the first hole body and the second hole body are in a shape of 8; the first hole body is located below the second hole body; and a diameter of the first hole body is less than a diameter of the second hole body.

Furthermore, the height adjustment structure includes at least two second screws and second nuts adapted to be used with the second screws; the fixed plate is provided with a plurality of second through holes arranged in a surrounding manner; the mounting plate is provided with a plurality of third through holes arranged in a surrounding manner; the second screws pass through the second through holes and the third through holes and are locked by the second nuts to fix the mounting plate to the fixed plate; the second nuts are locked at different positions on the second screws to limit a distance between the mounting plate and the fixed plate; and the at least two second screws are distributed around an outer side of the first opening.

Furthermore, the third through holes are elongated.

Furthermore, the mounting plate is a circular panel; the first opening is located in a center position of the circular panel; the third through holes are arc-shaped; a circle center of each third through hole is consistent with a circle center of the circular panel; and the third through holes are located next to the first opening.

Furthermore, the plurality of third through holes are divided into two groups and distributed around a circumferential side of the first opening; and distances between the third through holes in the two groups and the first opening are not equal.

Furthermore, the mounting plate is further provided with a plurality of fourth through holes distributed around the outer side of the first opening; and the fourth through holes are staggered from the third through holes in a direction away from the first opening.

Furthermore, the height adjustment structure further includes third nuts; and the second screws pass through the second through holes and are locked by the third nuts to define a relative position between the second screws and the fixed plate.

Furthermore, the height adjustment structure further includes fourth nuts; and the fourth nuts are locked onto the second screws and cooperate with the second nuts to fix the mounting plate.

Furthermore, the mounting plate is further provided with a plurality of pendant light through holes for mounting a pendant light.

Furthermore, the mounting plate is provided with a ground wire hole for fixing a ground wire with a screw; and the mounting plate, the fixed bracket, and the height adjustment structure all have conductive properties.

Furthermore, the decorative component is provided with a second opening for exposing the mounting plate, or the decorative component is integrally injection-molded with the mounting plate.

Furthermore, a width of the second opening is less than a width of a pendant light ceiling plate, and the width of the second opening is greater than a width of the mounting plate.

Compared with the prior art, the present invention has the beneficial effects below. In this invention, the adaptation base is adaptively used with the lamp holder on the downlight, thereby fixing the adaptation base to the lamp holder of the downlight and electrically connecting the adaptation base to the lamp holder of the downlight. In conjunction with the power cable, the power cable leads out power of the lamp holder on the downlight through the adaptation base. After passing through the first openings, the power cable can supply power to a suspended electrical appliance, to cause the suspended electrical appliance to work normally, without removal of the original downlight, circuit change, or rewiring, so that a workload of retrofitting a light is reduced. Furthermore, by configuring the fixed bracket inside the downlight and mechanically fixing the fixed bracket to the ceiling, the height adjustment structure is used to fixedly connect the fixed bracket to the mounting plate and is used to adjust the up-down relative position between the fixed bracket and the mounting plate, so that the downlight retrofit bracket of this embodiment can adapt to pendant light ceiling plates with different heights and downlights with different sizes. This improves the adaptability of the downlight retrofit bracket. In addition, by configuring the decorative component for decoration, the downlight retrofit bracket can adapt to different styles of pendant lights when fixed to the ceiling for use, thus achieving better coordination between the mounted pendant light and a style of an environment.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

DETAILED DESCRIPTION OF THE EMBODIMENTS

Figure 1:
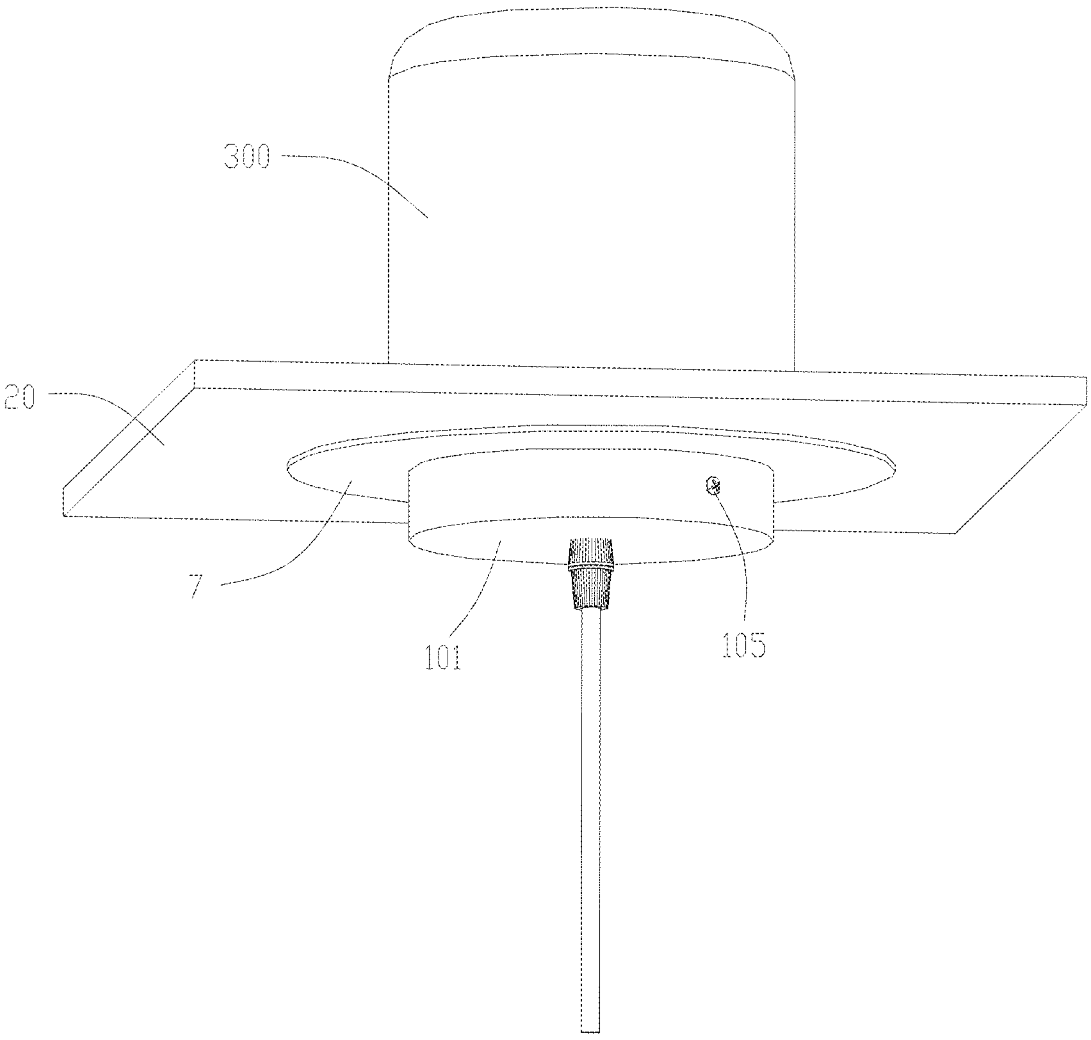
FIG. 1 is a schematic diagram of fixing in conjunction with a downlight, a ceiling, and a pendant light ceiling plate according to the present invention, where the pendant light ceiling plate is mounted on a side surface.

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

Referring to FIG. 1 to FIG. 7, an embodiment of the present invention provides a downlight retrofit bracket 100.

The downlight retrofit bracket 100 includes an adaptation base 1, a fixed bracket 20, a mounting plate 9, a height adjustment structure 8, and a decorative component 7. The adaptation base 1 is configured to adapt to a lamp holder on a downlight 300, and a power cable 10 electrically connected to the lamp holder on the downlight 300 is arranged on the adaptation base 1. The fixed bracket 20 is arranged inside the downlight 300 and is mechanically fixed to a ceiling 200. The mounting plate 9 is configured to mechanically fix a suspended electrical appliance. The mounting plate 9 is fixed to the fixed bracket 20 through the height adjustment structure 8. The height adjustment structure 8 is configured to be used to adjust an up-down relative position between the fixed bracket 20 and the mounting plate 9. The mounting plate 9 and the fixed bracket 20 are provided with a first opening 21 for threading out the power cable 10. The decorative component 7 is fixed on the ceiling 200.

In this embodiment, the adaptation base 1 is adaptively used with the lamp holder on the downlight 300, thereby fixing the adaptation base 1 to the lamp holder of the downlight 300 and electrically connecting the adaptation base 1 to the lamp holder of the downlight 300. In conjunction with the power cable 10, the power cable 10 leads out power of the lamp holder on the downlight 300 through the adaptation base 1. After passing through the first openings 21, the power cable 10 can supply power to a suspended electrical appliance, to cause the suspended electrical appliance to work normally, without removal of the original downlight, circuit change, or rewiring, so that a workload of retrofitting a light is reduced. Furthermore, by configuring the fixed bracket 20 inside the downlight and mechanically fixing the fixed bracket 20 to the ceiling 200, the height adjustment structure 8 is used to fixedly connect the fixed bracket 20 to the mounting plate 9 and is used to adjust the up-down relative position between the fixed bracket 20 and the mounting plate 9, so that the downlight retrofit bracket 100 of this embodiment can adapt to pendant light ceiling plates 101 with different heights and downlights 300 with different sizes. This improves the adaptability of the downlight retrofit bracket 100. In addition, by configuring the decorative component 7 for decoration, the downlight retrofit bracket 100 can adapt to different styles of pendant lights when fixed to the ceiling 200 for use, thus achieving better coordination between the mounted pendant light and a style of an environment.

Specifically, the suspended electrical appliance includes a ceiling fan, a pendant light, a track light, a light exposed out of the ceiling 200, and the like. When the lamp holder on the existing lamp tube is E26, the adaptation base 1 is a lamp base that is matched with the lamp holder E26. When the lamp holder on the existing downlight 300 is E27, the adaptation base 1 is a lamp base that is matched with the lamp holder E27. In the lamp holder E26 or E27 on the existing lamp tube, a bottom surface of an inner surface of the lamp holder is a negative electrode, and an inner side wall of the lamp holder is a positive electrode. That is, an outer side wall of the adaptation base 1 is a positive electrode 12, and a top surface of an outer surface of the adaptation base 1 is a negative electrode 11. The power cable 10 is divided into a positive wire 13 and a negative wire 14. The positive wire 13 is electrically connected to the positive electrode 12 of the adaptation base 1, and the negative wire 14 is electrically connected to the negative electrode 11 of the adaptation base 1, to lead out the power of the downlight retrofit bracket 100 in this embodiment without rewiring.

In an embodiment, the decorative component 7 is provided with a second opening 71 for exposing the mounting plate 9. Certainly, in other embodiments, the decorative component 7 can also be integrally injection-molded as with the mounting plate 9.

In an embodiment, the fixed bracket 20 includes a fixed plate 2 spaced apart from the mounting plate 9 in an up-down manner, and a plurality of connecting pieces 3 arranged on the fixed plate 2. The fixed plate 2 is provided with the first opening 21. The plurality of connecting pieces 3 are distributed around a center on the fixed plate 2. The connecting pieces 3 are fixed to the ceiling 200 through first fasteners 4, to fix the mounting plate 9 to the ceiling 200. Specifically, the center is a center of the first opening 21 or the fixed plate 2.

In an embodiment, each connecting piece 3 includes a first connecting plate 31 and a second connecting plate 32 formed by bending the first connecting plate 31 downward. The second connecting plate 32 is fixed to the ceiling 200 through the first fastener 4. The fixed bracket 20 further includes a second fastener 5. The first connecting plate 31 is connected to the fixed plate 2 through the second fastener 5. The second fastener 5 is at different positions on the first connecting plate 31 or the fixed plate 2 to adjust a relative position between the first connecting plate 31 and the fixed plate 2, thus adjusting a width of the entire fixed bracket 20 to adapt to widths of different lamp tubes.

Specifically, a surface of the first connecting plate 31 presses against a surface of the fixed plate 2, to improve the compactness of the structure of the fixed bracket 20. The second connecting plate 32 is perpendicular to the first connecting plate 31. Certainly, in other embodiments, the second connecting plate 32 can also be arc-shaped, that is, it is not perpendicular to the first connecting plate 31, and can be fixed to the ceiling 200 through the first fastener 4.

In an embodiment, the first connecting plate 31 is provided with an elongated strip-shaped hole 311. The second fastener 5 includes a first screw 52 and a first nut 51. The first screw 52 is fixed on the fixed plate 2. The first screw 52 passes through the strip-shaped hole 311 and is locked by the first nut 51 to fix the first connecting plate 31 with the fixed plate 2. A distance between two adjacent second connecting plates 32 is defined by a relative position between the first screw 52 and the strip-shaped hole 311. By using different positions of the first screw 52 on the strip-shaped hole 311, the relative position between the first connecting plate 31 and the fixed plate 2 can be adjusted, thereby adjusting an overall width of the fixed bracket 20 to adapt to a width of the lamp tube, so that the second connecting plate 32 abuts against a side wall of the lamp tube, to stably fix the second connecting plate 32 to the ceiling 200 through the fastener that passes through the side wall of the lamp tube.

In an embodiment, the first screw 52 is integrally formed with the fixed plate 2 to reduce a quantity of parts for the downlight retrofit bracket 100 in this embodiment, and it is convenient for a user to mount the fixed plate 2 and the connecting piece 3. Certainly, in other embodiments, the first screw 52 is not integrally formed with the fixed plate 2. That is, the first screw 52 is locked by the first nut 51 after passing through the fixed plate 2 and the strip-shaped hole 311, which can also adjust the relative position between the fixed plate 2 and the first connecting plate 31.

In an embodiment, a gasket 53 is further arranged between the first nut 51 and the first connecting plate 31, and the gasket 53 sleeves the first screw 52. A width of the gasket 53 is greater than a width of the strip-shaped hole 311. Using the gasket 53 can further improve the stability and smoothness of connection between the fixed plate 2 and the first connecting plate 31.

In an embodiment, three connecting pieces 3 are included, which are uniformly distributed around the center of the fixed plate 2. Certainly, in other embodiments, four, five, or more connecting pieces 3 may also be included.

In an embodiment, the second connecting plate 32 is provided with a first through hole 33, and the first fastener 4 passes through the first through hole 33 to fix the second connecting plate 32 to the ceiling 200, to thread one end of the first fastener 4 through the second connecting plate 32.

In an embodiment, the first through hole 33 includes a first hole body 321 and a second hole body 322 communicated to the first hole body 321. The first hole body 321 and the second hole body 322 are in a shape of figure "8". The first hole body 321 is located below the second hole body 322. A diameter of the first hole body 321 is less than a diameter of the second hole body 322. Furthermore, when the first fastener 4 is a nail or a screw, a width of a head portion of the nail and a width of a head portion of the screw are both larger than the diameter of the first hole body 321, but less than the diameter of the second hole 322. That is, a user can first fix the screw and the nail to the ceiling 200, and then align the second hole body 322 with the screw or the nail, thus hanging the fixed bracket 20 on the first fastener 4.

Certainly, in other embodiments, the connecting piece 3 can also be integrally formed with the fixed plate 2. Furthermore, a plurality of strip-shaped holes 311 may be included, which are fixedly distributed and spaced apart in a length direction of the first connecting plate 31.

In an embodiment, the height adjustment structure 8 includes at least two second screws 81 and second nuts 82 adapted to be used with the second screws 81. The fixed plate 2 is provided with a plurality of second through holes 22 arranged in a surrounding manner. The mounting plate 9 is provided with a plurality of third through holes 92 arranged in a surrounding manner. The second screws 81 pass through the second through holes 22 and the third through holes 92 and are locked by the second nuts 82 to fix the mounting plate 9 to the fixed plate 2. The second nuts 82 are locked at different positions on the second screws 81 to limit a distance between the mounting plate 9 and the fixed plate 2. The at least two second screws 81 are distributed around an outer side of the first opening 21. The fixed plate 2 is fixed to the ceiling 200 through the connecting pieces 3. That is, the position of the fixed plate 2 remains unchanged, and the second screws 81 are basically perpendicular to the fixed plate 2. By adjusting relative positions of the second nuts 82 on the second screws 81, the distance between the mounting plate 9 and the fixed plate 2 can be adjusted, so that a user can adjust the distance between the mounting plate 9 and the fixed plate 2 independently according to different pendant light ceiling plates 101 and different lamp tube depths, to adapt to different pendant light ceiling plates 101 and different lamp tube depths for use.

In an embodiment, the third through holes 92 are elongated, so that a user can sleeve the second screws 81 with the third through holes 92 in the mounting plate 9 and fix the mounting plate 9 with the second nuts 82. The user does not need to accurately align the third through holes 92 with the second screws 81. The elongated third through holes 92 allows for an offset in relative positions between the plurality of second screws 81, making it convenient for mounting. Moreover, by using the elongated third through holes 92, it is possible to ensure that the second nuts 82 on the plurality of second screws 81 are not located on the same plane, that is, heights of the second nuts 82 on the plurality of second screws 81 are not consistent, so that the mounting plate 9 is inclined. Namely, the mounting plate 9 and the fixed plate 2 are not parallel to each other, to adapt to the ceiling 200 with an inclination angle. This improves the practicality of the downlight retrofit bracket 100 in this embodiment.

In an embodiment, the mounting plate 9 is a circular panel. The first opening 21 is located in a center position of the circular panel. The third through holes 92 are arc-shaped. A circle center of each third through hole 92 is consistent with a circle center of the circular panel. The third through holes 92 are located next to the first opening 21.

In an embodiment, the plurality of third through holes 92 are distributed in two rows, and the third through holes 92 in each row are distributed around the circle center of the circular panel. That is, the plurality of third through holes 92 are divided into two groups which are distributed around a circumferential side of the first opening 21. Distances between the third through holes 92 in the two groups and the first opening 21 are not equal, so that the third through holes 92 at different positions can be selected to adapt to the pendant light ceiling plates 101 with different widths. This allows a user to fix the mounting plate 9 through cooperation between the third through holes 92 and the second screws 81, without accurately aligning the third through holes 92 with the second screws 81, making it convenient for mounting.

In an embodiment, 12 third through holes 92 are included, and a quantity of the third through holes 92 in each row is equal. That is, each row includes six third through holes 92, so that a user can select at least two third through holes 92 to fix a pendent light ceiling plate together with screws and nuts.

Certainly, in other embodiments, when the third through holes 92 are dot-like, i.e. are not elongated, at least four third through holes 92 are included, and two third through holes 92 can also be reserved to fix a pendent light ceiling plate together with screws and nuts.

In an embodiment, the mounting plate 9 is further provided with a plurality of fourth through holes 93 distributed around the outer side of the first opening 21. The fourth through holes 93 and the third through holes 92 are arranged in a staggered direction in a direction away from the first opening 21, that is, a distance between two symmetrical fourth through holes 93 and a distance between two symmetrical third through holes 92 are different, to improve the adaptability of the downlight retrofit bracket 100 in this embodiment to more pendant light ceiling plates 101 with different widths.

At present, most of the existing pendent light ceiling plates 101 are generally fixed to the ceiling 200 by using two screws, and a distance between the two screws is generally 90 cm, that is, the distance between the two symmetrical third through holes 92 can be 90 cm. Certainly, in a pendant light ceiling plate 101 with another size, the distance between the two screws that fix the pendant light ceiling plate 101 may be greater than or less than 90 cm. That is, by configuring the plurality of arc-shaped third through holes 92, dot-like fourth through holes, and the like, the mounting plate 9 can fix pendant light ceiling plates 101 with different sizes.

In an embodiment, the mounting plate 9 is provided with a ground wire hole 94 for fixing a ground wire with a screw. The mounting plate 9, the fixed bracket 20, and the height adjustment structure 8 all have conductive properties. Some of existing pendent lights have three power connection wires, namely a positive electrode, a negative electrode, and a ground wire. The positive electrode and the negative electrode are respectively connected to the positive wire 13 and the negative wire 14 of the adaptation base 1. The ground wire can be fixed in the ground wire hole 94 through a screw, to connect the mounting plate 9, the height adjustment structure 8, and the fixed bracket 20 to a ground side wall of the downlight or the ceiling 200 to achieve a grounding effect. Certainly, in an embodiment where the ground wire hole 94 is not configured, the ground wire can be directly placed on a wall of the downlight, the mounting plate 9, or the like.

In an embodiment, the height adjustment structure 8 further includes third nuts 83. The second screws 81 pass through the second through holes 22 and are locked by the third nuts 83 to define a relative position between the second screws 81 and the fixed plate 2. To prevent the second screws 81 from moving relative to the fixed plate 2 during the mounting of a pendant light, which may affect the balance of the mounting plate 9.

In an embodiment, the height adjustment structure 8 further includes fourth nuts 84. The fourth nuts 84 are locked onto the second screws 81 and cooperate with the second nuts 82 to fix the mounting plate 9. A height of the mounting plate 9 is displayed using the fourth nuts 84 to prevent such a situation that when a user mounts a pendent light ceiling plate 101 by using the mounting plate 9, the mounting plate 9 moves upward, which affects the mounting.

In an embodiment, the mounting plate 9 is further provided with a plurality of pendant light through holes 91 for mounting a pendant light. The pendant light through holes 91 can be third through holes 92 or other through holes, to fix the pendant light ceiling plate 101 on the mounting plate 9 together with screws and nuts.

In an embodiment, a width of the second opening 71 is less than a width of the pendant light ceiling plate 101. When the pendant light ceiling plate 101 is mechanically fixed on the mounting plate 9, the decorative component 7 can be compressed and fixed to the ceiling 200.

In an embodiment, the width of the second opening 71 is greater than a width of the mounting plate 9 to fully expose the mounting plate 9, so that a user can mechanically fix the pendant light ceiling plate 101 to the mounting plate 9 through the third through holes 92 or the pendant light through holes 91.

Figure 7:
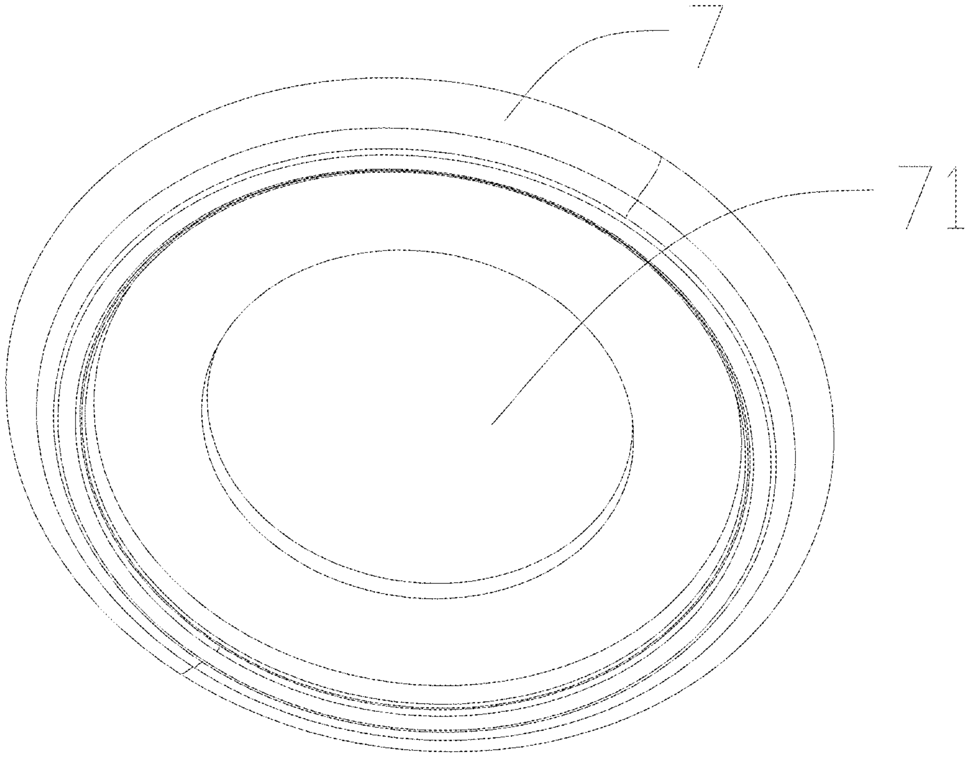
FIG. 7 is a schematic diagram of a decorative component according to another embodiment of the present invention.

In an embodiment, the decorative component 7 is panel-shaped. The decorative component 7 is covered by the pendant light ceiling plate 101 when the pendant light ceiling plate 101 is mechanically fixed to the mounting plate 9. Different styles of pendent lights can be configured with different decorative components 7 to achieve better coordination between a style of a mounted pendent light and a style of an environment. Certainly, in other embodiments, the decorative component 7 may not be panel-shaped, and may be a part with a shape or a concave-convex appearance, as shown in FIG. 7.

Figure 3:
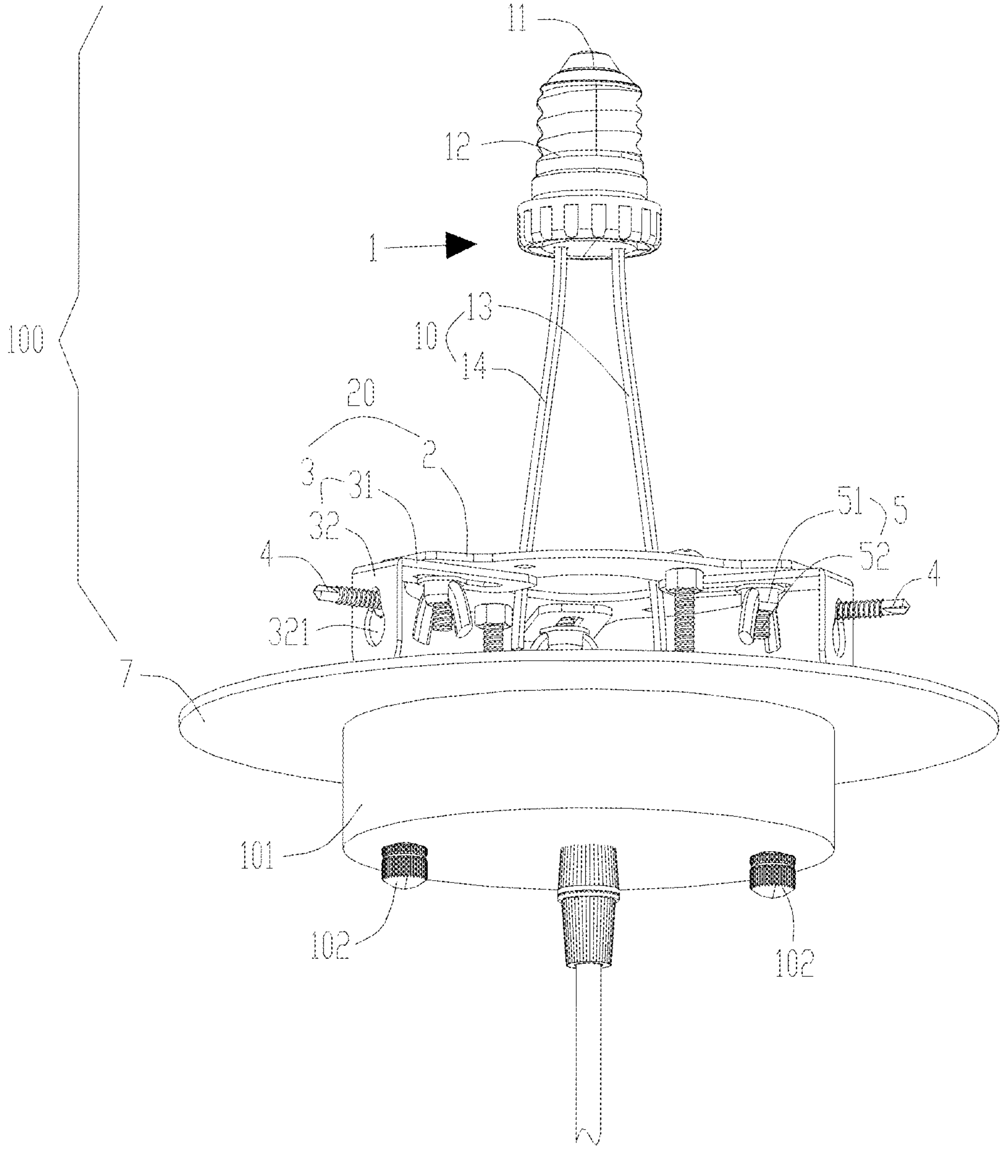
FIG. 3 is a schematic diagram of fixing in conjunction with a pendant light ceiling plate according to the present invention, where the pendant light ceiling plate is mounted on a surface.
Figure 4:
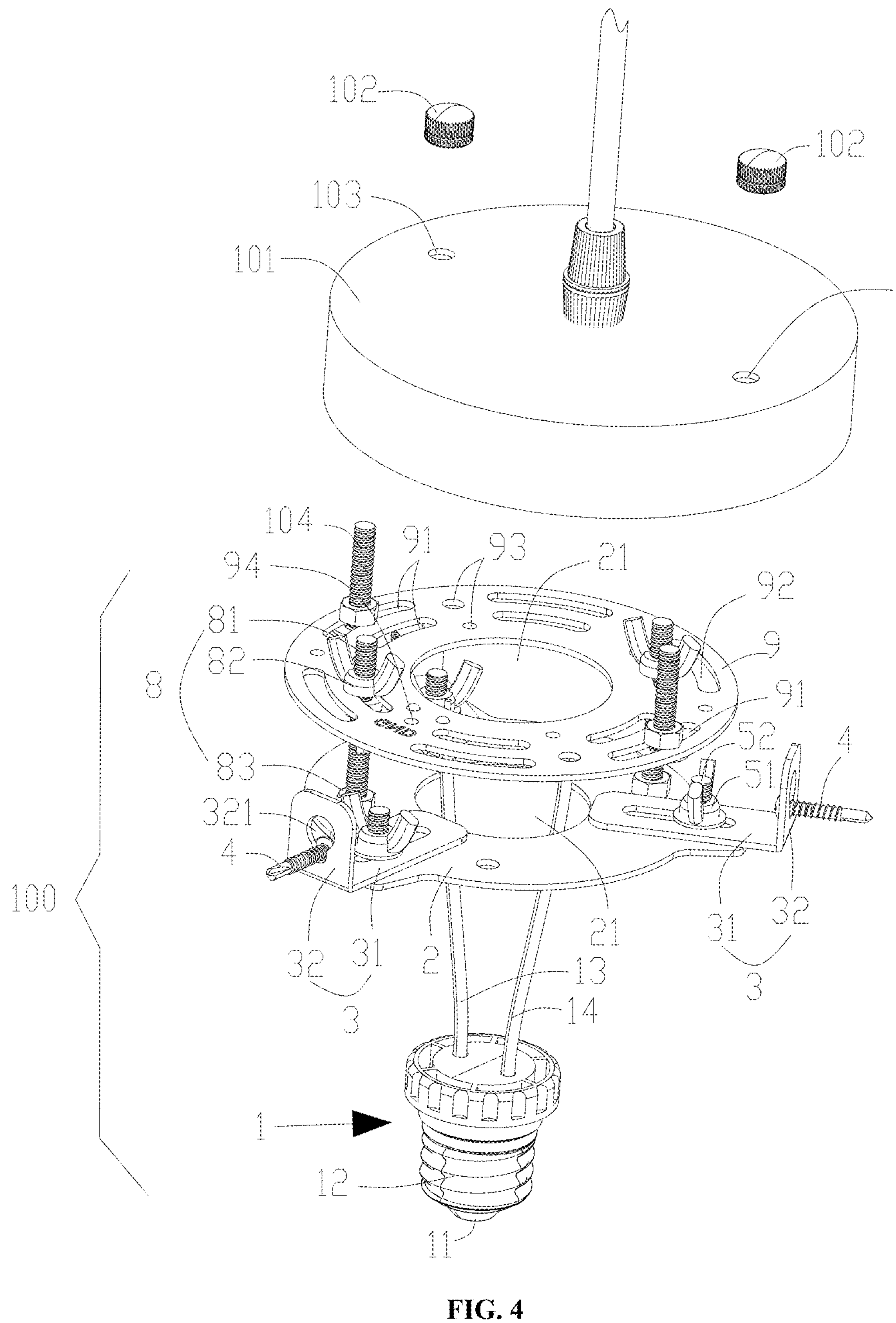
FIG. 4 is a partially exploded view of fixing in conjunction with a pendant light ceiling plate according to the present invention, where the pendant light ceiling plate is mounted on a surface.
Figure 5:
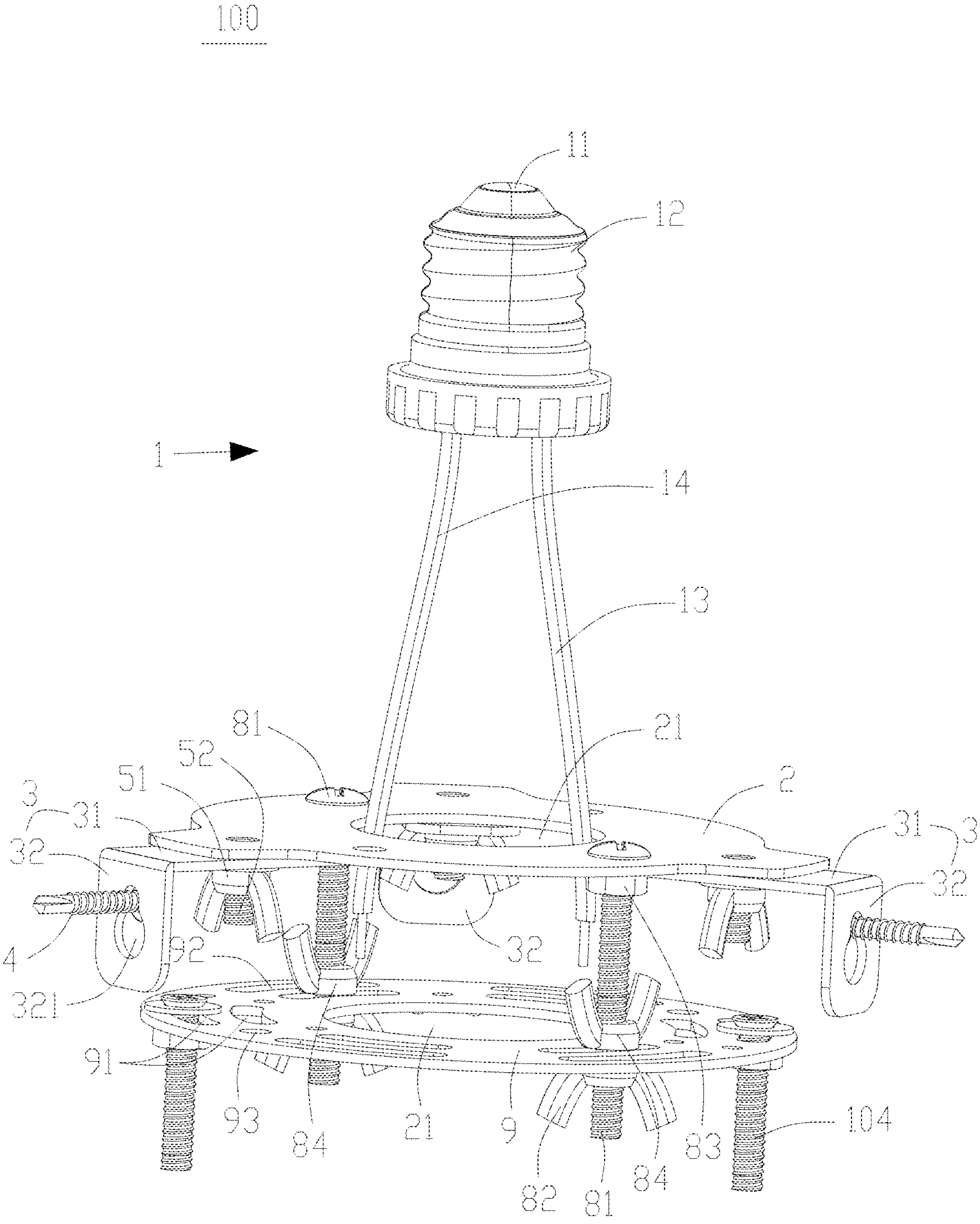
FIG. 5 is a structural diagram of fixing in conjunction with third screws according to the present invention.
Figure 6:
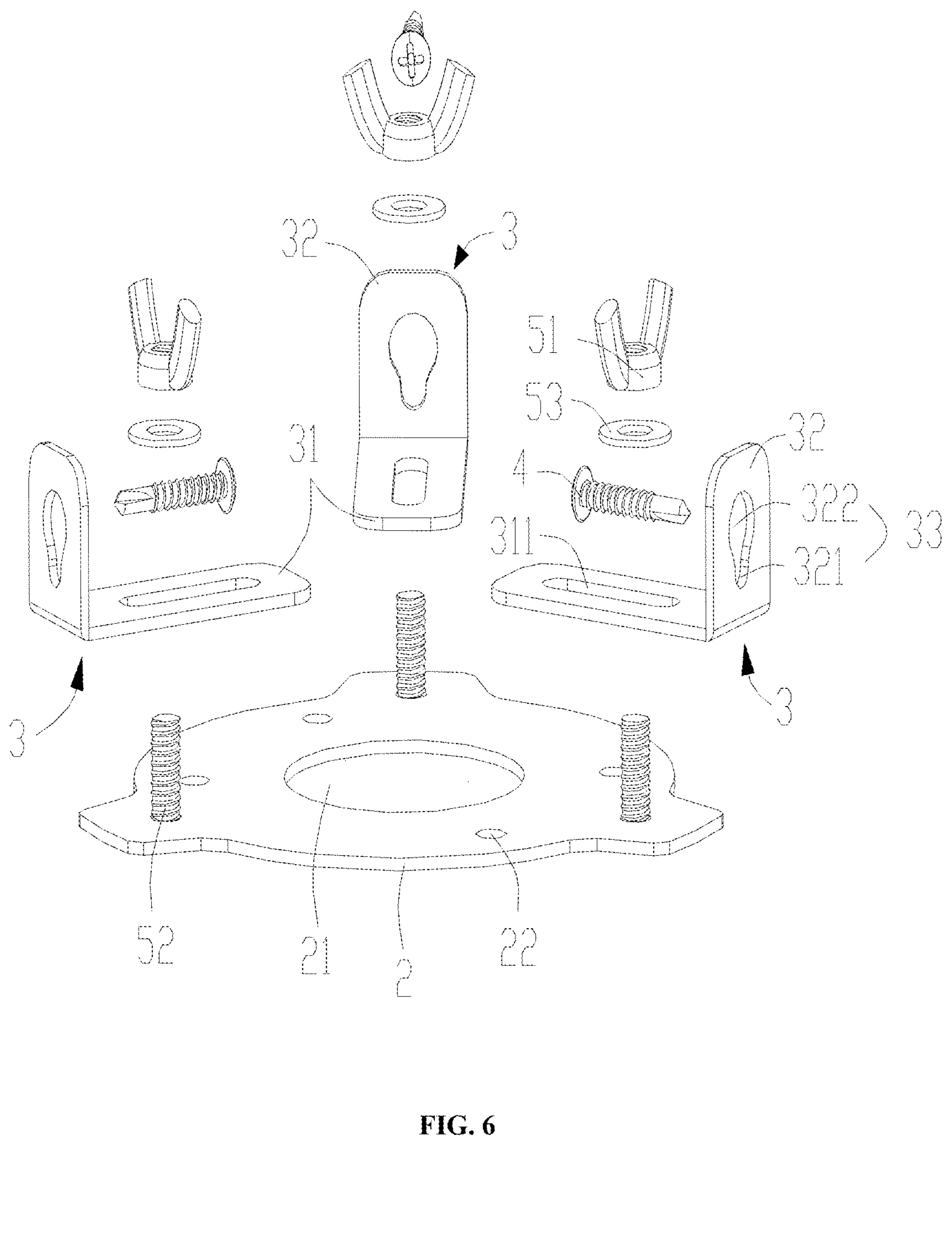
FIG. 6 is an exploded view of a mounting bracket and a first fastener according to the present invention.

Based on the downlight retrofit bracket 100 in the above embodiment, referring to FIG. 3 and FIG. 4, a surface of a pendant lamp ceiling plate 101 is mounted on the bracket of this embodiment. A method for mounting the surface of the pendant light ceiling plate 101 includes the following steps:

1. Fixing the adaptation base 1 onto the lamp holder.
2. Threading the fixed plate 2 through the strip-shaped holes 311 on the first connecting plates 31 through the first screw 52, and locking and fixing the fixed plate 2 through the first nuts 51 to fix the plurality of connecting pieces 3 around the first opening 21; and fixing the second connecting plates 32 to the ceiling 200 through the first fasteners 4 to fix the fixed bracket 20.
3. Fix the mounting plate 9 to the fixed plate 2 through the height adjustment structure 8.
4. Connecting the power cable 10 to a wire on a pendent light.
5. Threading one end of each third screw 104 through each third through hole 92 or each pendant light through holes 91; then threading one end of the third screw 104 through each via hole 103 of the pendant light ceiling plate 101 in a thickness direction of the pendant light ceiling plate 101, and locking the end through each fifth nut 102 to fix the pendant light ceiling plate 101 and compress the decorative part 7 to fix the pendant light, thus completing retrofit of the downlight 300 into the pendant light.

In the steps of the above mounting method, orders of steps 1, 2, and 3 can be interchanged, which does not affect the mounting of the pendant light ceiling plate 101. The decorative component 7 can also be preliminarily fixed to the ceiling 200 by pasting. In this way, the decorative component 7 can be mounted to the ceiling 200 in any step before step 4. When the decorative component 7 is not fixed to the ceiling 200 in advance, the decorative component 7 sleeves an outer side of the mounting plate 9 or the height adjustment structure 8 between step 3 and step 4, and is further compressed and fixed when the pendant light ceiling plate 101 is fixed.

Figure 2:
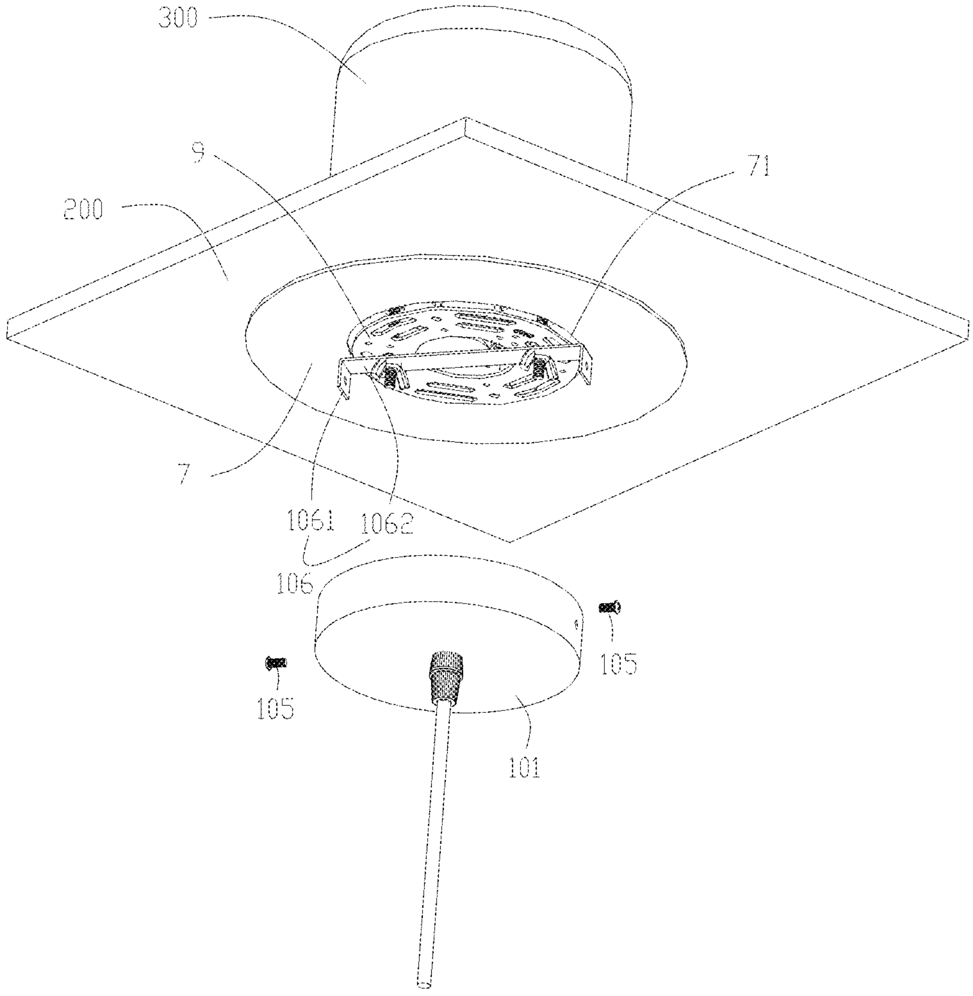
FIG. 2 is a partially exploded view of fixing in conjunction with a downlight, a ceiling, and a pendant light ceiling plate according to the present invention, where the pendant light ceiling plate is mounted on a side surface.

Furthermore, based on the downlight retrofit bracket 100 in the above embodiment, referring to FIG. 1 and FIG. 2, a side surface of a pendant lamp ceiling plate 101 is mounted on the bracket of this embodiment. A method for mounting the side surface of the pendant light ceiling plate 101 includes the following steps:

1. Fixing the adaptation base 1 onto the lamp holder.
2. Threading the fixed plate 2 through the strip-shaped holes 311 on the first connecting plates 31 through the first screw 52, and locking and fixing the fixed plate 2 through the first nuts 51 to fix the plurality of connecting pieces 3 around the first opening 21; and fixing the second connecting plates 32 to the ceiling 200 through the first fasteners 4 to fix the fixed bracket 20.
3. Respectively threading the plurality of second screws 81 through the corresponding second through holes 22, the corresponding pendant light through holes 91, and a side surface mounting panel 1062 on a side surface mounting bracket 106, and locking the second screws 81 through the second nuts 82.
4. Connecting the power cable 10 to a wire on a pendent light.
5. Sleeving the side surface mounting bracket 106 with the pendant light ceiling plate 101; placing one end of each of a plurality of fourth screws 105 from an outer side of the pendant light ceiling plate 101 to an inner side of the pendant light ceiling plate 101; and locking the end to a side edge connecting plate 1061 on the side surface mounting bracket 106, to fix the pendant light ceiling plate 101, thus completing the fixing of the pendant light and completing retrofit of the downlight 300 into the pendant light.

In the steps of the above mounting method, orders of steps 1, 2, and 3 can be interchanged, which does not affect the mounting of the pendant light ceiling plate 101. The decorative component 7 can also be preliminarily fixed to the ceiling 200 by pasting. In this way, the decorative component 7 can be mounted to the ceiling 200 in any step before step 4. When the decorative component 7 is not fixed to the ceiling 200 in advance, the decorative component 7 sleeves an outer side of the mounting plate 9 or the height adjustment structure 8 between step 3 and step 4, and is further compressed and fixed when the pendant light ceiling plate 101 is fixed.

Certainly, in an embodiment where the mounting plate 9 is integrated with the decorative component 7, the mounting plate 9 can be directly fixed to the fixed plate 2 through the height adjustment structure 8, which can eliminate the mounting of the decorative component 7.

It should be noted that all directional indications (such as up, down, left, right, front, back . . . ) in the embodiments of the present invention are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present invention are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present invention.

The above descriptions are only preferred embodiments of the present invention, and are not intended to limit the patent scope of the present invention. Any equivalent structural transformation made by using the content of the specification and the drawings of the present invention under the invention idea of the present invention, directly or indirectly applied to other related technical fields, shall all be included in the scope of patent protection of the present invention.

What is claimed is:

1. A downlight retrofit bracket, comprising:
an adaptation base for use with a lamp holder on a downlight, wherein the adaptation base is provided with a power cable electrically connected to the lamp holder on the downlight;
a fixed bracket arranged inside the downlight, wherein the fixed bracket is mechanically fixed to a ceiling;
a mounting plate for mechanically fixing a suspended electrical appliance, wherein the mounting plate and the fixed bracket are provided with a first opening for threading out the power cable;
a height adjustment structure, wherein the mounting plate is fixed on the fixed bracket through the height adjustment structure, and the height adjustment structure is configured to be used to adjust an up-down relative position between the fixed bracket and the mounting plate; and
a decorative component configured to be attached to a surface of the ceiling for decoration.

2. The downlight retrofit bracket according to claim 1, wherein the fixed bracket comprises: a fixed plate spaced apart from the mounting plate in an up-down manner, and a plurality of connecting pieces arranged on the fixed plate; the fixed plate is provided with the first opening; the plurality of connecting pieces are distributed around a center on the fixed plate; and the connecting pieces are fixed to the ceiling through first fasteners.

3. The downlight retrofit bracket according to claim 2, wherein each connecting piece comprises a first connecting plate and a second connecting plate formed by bending the first connecting plate; the second connecting plate is fixed to the ceiling through the first fastener;
the fixed bracket further comprises a second fastener; the first connecting plate is connected to the fixed plate through the second fastener; and the second fastener is at different positions on the first connecting plate or the fixed plate to adjust a relative position between the first connecting plate and the fixed plate.

4. The downlight retrofit bracket according to claim 3, wherein a surface of the first connecting plate presses against a surface of the fixed plate, and the second connecting plate is perpendicular to the first connecting plate.

5. The downlight retrofit bracket according to claim 3, wherein the first connecting plate is provided with an elongated strip-shaped hole; the second fastener comprises a first screw and a first nut; the first screw is fixed on the fixed plate; the first screw passes through the strip-shaped hole and is locked by the first nut to fix the first connecting plate with the fixed plate; and a distance between two adjacent second connecting plates is defined by a relative position between the first screw and the strip-shaped hole.

6. The downlight retrofit bracket according to claim 5, wherein the first screw is integrally formed with the fixed plate.

7. The downlight retrofit bracket according to claim 5, wherein the plurality of connecting pieces comprises three connecting pieces, the three connecting pieces are uniformly distributed around the center of the fixed plate.

8. The downlight retrofit bracket according to claim 5, wherein the second connection plate is provided with a first through-hole, and a second through-hole and the first fastener passes through the first through hole to fix the second connecting plate to the ceiling.

9. The downlight retrofit bracket according to claim 8, wherein the first through hole comprises a first hole body and a second hole body communicated to the first hole body; and a diameter of the first hole body is less than a diameter of the second hole body.

10. The downlight retrofit bracket according to claim 2, wherein the height adjustment structure comprises at least two second screws and second nuts adapted to be used with the second screws; the fixed plate is provided with a plurality of second through holes arranged in a surrounding manner; the mounting plate is provided with a plurality of third through holes arranged in a surrounding manner; the second screws pass through the second through holes and the third through holes and are locked by the second nuts to fix the mounting plate to the fixed plate; the second nuts are locked at different positions on the second screws to limit a distance between the mounting plate and the fixed plate; and the at least two second screws are distributed around an outer side of the first opening.

11. The downlight retrofit bracket according to claim 10, wherein the third through holes are elongated.

12. The downlight retrofit bracket according to claim 10, wherein the mounting plate is a circular panel; the first opening is located in a center position of the circular panel; the third through holes are arc-shaped; a circle center of each third through hole is consistent with a circle center of the circular panel; and the third through holes are located next to the first opening.

13. The downlight retrofit bracket according to claim 10, wherein the plurality of third through holes are divided into two groups and distributed around a circumferential side of the first opening; and distances between the third through holes in the two groups and the first opening are not equal.

14. The downlight retrofit bracket according to claim 13, wherein the mounting plate is further provided with a plurality of fourth through holes distributed around the outer side of the first opening; and the fourth through holes are staggered from the third through holes in a direction away from the first opening.

15. The downlight retrofit bracket according to claim 10, wherein the height adjustment structure further comprises third nuts; and the second screws pass through the second through holes and are locked by the third nuts to define a relative position between the second screws and the fixed plate.

16. The downlight retrofit bracket according to claim 15, wherein the height adjustment structure further comprises fourth nuts; and the fourth nuts are locked onto the second screws and cooperate with the second nuts to fix the mounting plate.

17. The downlight retrofit bracket according to claim 10, wherein the mounting plate is further provided with a plurality of pendant light through holes for mounting a pendant light.

18. The downlight retrofit bracket according to claim 1, wherein the mounting plate is provided with a ground wire hole for fixing a ground wire with a screw; and the mounting plate, the fixed bracket, and the height adjustment structure all have conductive properties.

19. The downlight retrofit bracket according to claim 1, wherein the decorative component is provided with a second opening for exposing the mounting plate, or the decorative component is integrally injection-molded with the mounting plate.

20. The downlight retrofit bracket according to claim 19, wherein a width of the second opening is less than a width of a pendant light ceiling plate, and the width of the second opening is greater than a width of the mounting plate.

* * * * *